April 21, 1931.  L. A. NEMCOVSKY  1,801,753
DOLL EYES
Filed July 14, 1925   2 Sheets-Sheet 1
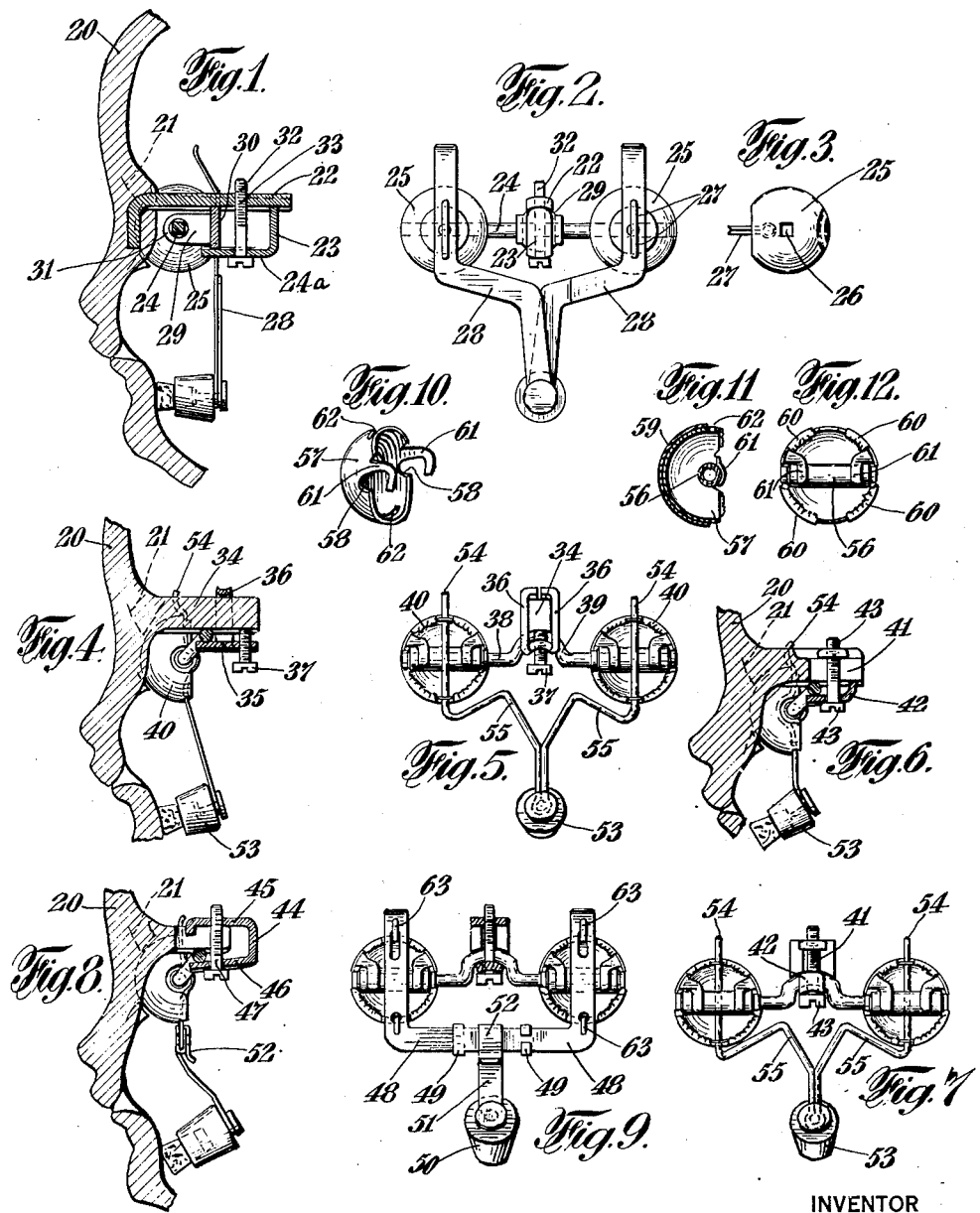
INVENTOR
Louis A. Nemcovsky
BY
Dean, Fairbank, Obright & Hirsch.
ATTORNEYS April 21, 1931. L. A. NEMCOVSKY 1,801,753
DOLL EYES
Filed July 14, 1925 2 Sheets-Sheet 2
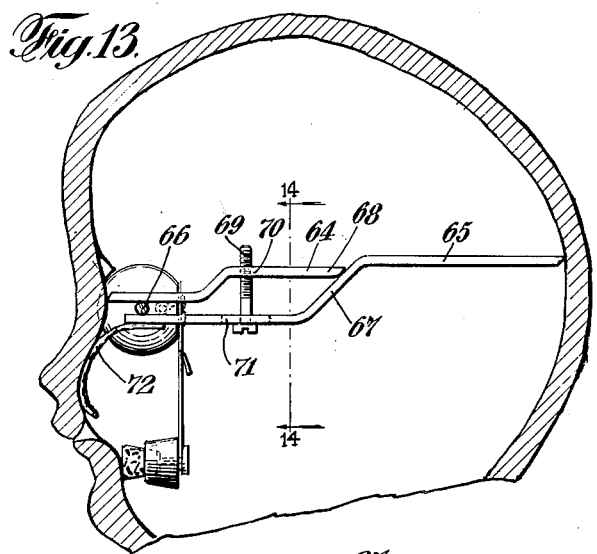
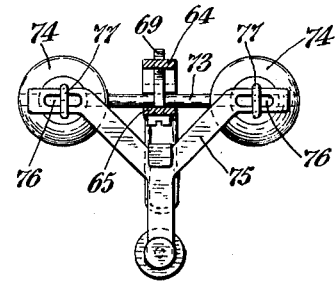
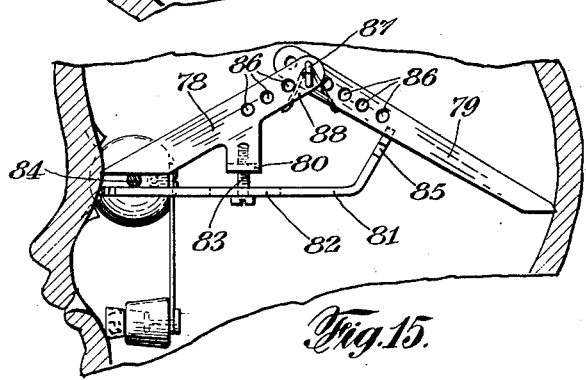
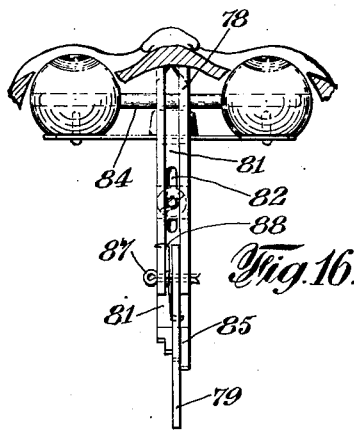
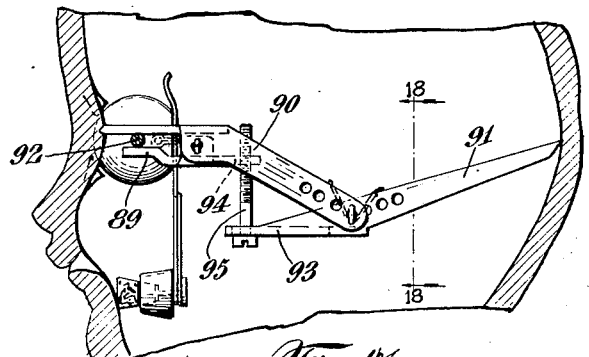
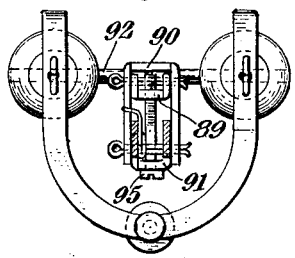
INVENTOR
Louis A. Nemcovsky
BY
Dean, Fairbank, Obrieght & Hirsch
ATTORNEYS Patented Apr. 21, 1931

1,801,753

UNITED STATES PATENT OFFICE

LOUIS A. NEMCOVSKY, OF NEW YORK, N. Y., ASSIGNOR, BY MESNE ASSIGNMENTS, TO MARKON MANUFACTURING CO., INC., OF NEW YORK, N. Y., A CORPORATION OF NEW YORK

DOLL EYES

Application filed July 14, 1925. Serial No. 43,438.

My present invention relates primarily to dolls having mechanism for movable elements such as eyes, and has particular reference to a construction and method of assembly and installation of such mechanism and of a supporting device therefor.

An object of the invention is to provide a mechanism of the type referred to which will consist of relatively few parts of simple construction; which will be inexpensive to manufacture; which will require the least expenditure of time and skill to assemble and install; and which will at the same time be staunch and efficient in operation.

Another object is to provide a mechanism and a supporting device therefor, which will be suitable for dolls' heads of diverse sizes, shapes, and proportions, and which will adjust and adapt itself to the various irregularities in dolls' heads produced in the course of their manufacture.

Another object of the invention is to provide a mechanism of the type referred to which will be insertable and adjustable within the dolls' head without the use of special tools or of attaching substances such as cement solder or the like.

Another object is to provide a supporting device for the movable mechanism which will allow the latter to be independently assembled and installed so as to permit adjustment of the movable elements into correct position, whereupon the supporting device may be inserted and brought into operative postion and subsequently adjusted to clamp the mechanism in position.

According to one feature of the invention, the movable mechanism comprises a bridge member having movable elements, such as eyeballs, slidably and rotatably mounted with respect thereto so that these elements may adjust themselves with respect to the distance between them; and the supporting device comprises one or more adjustable bracing members subsequently brought into position and engaging the bridge member therebetween, and means for thereupon adjusting the bracing members to clamp the bridge member and secure it in correct adjusted position.

According to another feature of the invention, the supporting device is designed to engage and to be held in position by portions of the wall of the doll head, and means are provided whereby the adjustment of the bracing members will simultaneously clamp the bridge member and more firmly secure the supporting device itself in its position within the doll head.

Another feature of the invention lies in pivotally mounting the bridge member with respect to the supporting device to enable it to rock in an axial plane whereby complete and accurate adjustment of the movable elements to irregularities in the doll head may be facilitated and effected.

In a preferred construction, the bracing members comprise a fixed bracing member or bracket, either integral with or attached to the wall of the head, and a relatively movable bracing member adjustably carried by the bracket and forming a bearing between itself and the bracket within which the bridge member is pivotally mounted. The adjustable member may be so carried as to be completely detachable during the installation and adjustment of the movable elements of the mechanism, or it may be carried in a manner to permit it to be temporarily swung out of the way of the installed mechanism.

In a preferred construction, the bearing between the adjustable member and the bracket is curved and the bridge member is provided with a curved bearing portion adapted to find a pivotal support in the bearing, whereby rocking of the bridge member in an axial plane is made possible.

In another embodiment, the relatively movable and adjustable bracing members of the supporting device are insertible into the head in a manner causing them to engage opposite walls of the doll head, preferably by finding footings and biting therein. In this type of construction, certain of the members support the bridge member therebetween and are preferably provided with means for temporarily retaining them in engaged position with the walls of the head. Means are provided for thereupon drawing the members together to clamp the bridge member, and for simultaneously causing adjustment of the members to increase their combined effective length whereby they will bite more firmly and secure a permanent footing in the opposite walls of the doll head.

According to another feature of the invention the bracing members of the type last referred to may comprise a toggle frame consisting of toggle members and a cooperating strut therefor, the mechanism for the movable elements being held firmly between the strut and one of the toggle members. Means, preferably comprising a bolt or the like, cooperate with the strut and the toggle members to cause simultaneous clamping of the mechanism and spreading of the toggle members.

In another type of construction, the toggle members may be replaced by two cooperating members biting into opposite walls of the doll head respectively, and one thereof having an inclined portion engaged by the free end of the other whereby relative movement of the members transversely toward each other to clamp the mechanism will cause the engaging end to move the members longitudinally of each other, thereby increasing their combined effective length and causing them to secure a firm footing against the walls of the doll head.

Another object of the invention is to provide an eyeball for dolls of the type referred to which will be of simple construction and inexpensive to manufacture, and which comprises briefly an eyeball in the nature of a hollow hemispherical frame carrying a sleeve along one diameter thereof and being provided with bendable tabs for gripping the sleeve.

Another object of the invention is to provide an improved counterweight which may be carried by the eyeballs and which is of a construction which will permit adjustment of the counterweight frame with the axial adjustment of the eyeballs along the bridge member.

Other objects of the invention lie in effecting the improvements in the construction and method of assembly and installation of mechanism of the character referred to in respects more fully described hereinafter and set forth in the appended claims.

In the accompanying drawings, illustrating by way of example several embodiments of the various features of my invention, Fig. 1 is a side elevation, partly in section, of the face of a doll with one form of the assembled device in position;

Fig. 2 is a rear elevation of the mechanism shown in Fig. 1;

Fig. 3 is an elevation of a form of eyeball as used in the construction illustrated in Figs. 1 and 2;

Figs. 4, 6 and 8 are views similar to Fig. 1, showing modified forms of construction;

Figs. 5, 7 and 9 are rear elevations of the mechanisms illustrated in Figs. 4, 6 and 8, respectively;

Fig. 10 is a perspective view of the frame of an eye-ball as used in the construction illustrated in Figs. 4-9 inclusive.

Figs. 11 and 12 are a side view in cross section, and a rear view respectively of an eyeball of the type last referred to, completely assembled;

Figs. 13, 15 and 17, are views similar to Fig. 1, illustrating modified forms of construction;

Fig. 14 is a rear elevation of the mechanism illustrated in Fig. 13, and partly in section along the line 14—14 of Fig. 13;

Fig. 16 is a plan view of the mechanism illustrated in Fig. 15; and

Fig. 18 is a rear elevation of the mechanism illustrated in Fig. 17, and partly in section along the line 18—18 of Fig. 17.

Referring now to the drawings and particularly to Figs. 1-9 inclusive, I have shown a portion of a doll's head 20 provided with sockets 21 for the reception of eyeballs. In each of these figures, I have shown the bracing members comprising a fixed bracing member or bracket, and a relatively movable bracing member adjustably carried by the bracket to form a bearing therebetween for the eyeball mounting or bridge member. Referring particularly to Figs. 1 and 2, I have shown a fixed bracing member or supporting bracket 22 molded in the portion of the doll head between the eyesockets, and projecting into the interior of the head. The movable bracing member 23 is carried by the bracket 22 to provide a portion 24$^a$ at a spaced distance below the bracket 22. The under surface of the bracket 22 and the upper surface of the portion 24 are each concavely curved to provide a curved bearing therebetween. The bridge member comprises a shaft or spindle 24 having non-circular ends to receive eyeballs 25 provided with openings 26 suitably shaped to fit over the ends of the shaft 24. These eyeballs are more fully described and claimed by me in a copending application, and are provided with bendable fastening means 27 insertable through openings in a counterweight frame 28, which is thereby carried by the eyeballs. Midway of its length the shaft 24 is provided with a curved bearing portion 29 which comprises a convexly curved portion 30 pivotally mounted in the bearing between the portion 24$^a$ and the bracket 22, and having apertured ears 31 adapted to receive the shaft 24 therethrough. The bracing member 23 is attached to the bracket 22 by any suitable adjustable means such as a bolt 32 carried by the bracing member 23 and engaging a threaded opening 33 in the bracket 22.

In assembling this device the bracing member 23 is either entirely detached from the bracket 22 or is loosely carried thereby, by means of the bolt 32. In the latter case, it is temporarily swung out of the position shown in Fig. 1, so as not to interfere with the insertion of the eye mechanism proper. The latter is independently assembled by mounting the shaft 24 in the bearing portion 29, mounting the eyeballs on the shaft 24, and then attaching the counterweight 28 to the eyeballs. This assembly is then inserted into the head of the doll and the bearing portion 29 is positioned underneath the bracket 22 in approximately the position shown in Fig. 1. Thereupon the bracing member 23 is either attached to the bracket 22 or swung back into its normal position to engage and support the bearing portion 29 from underneath. The slidable mounting of the eyeballs on the shaft 24, together with the curvature of the bearing portion 29 and of the corresponding bearing therefor will allow the eyeballs to adjust themselves not only in an axial direction but also in an axial plane to the positions of the eyesockets of that particular head. After this adjustment has been effected, the bolt 32 is screwed home to simultaneously clamp the bridge member and more firmly secure the bracing member itself in position.

In Figs. 4, 6 and 8, the fixed bracing member or supporting bracket is shown as an integral projecting portion of the doll head. In Fig. 4, the bracket is shown at 34 and the movable bracing member comprises a portion 35 underlying the bracket 34 at a spaced distance therefrom, and integral arms 36 extending up from the portion 35 and embracing the bracket 34. The under sides of the uppermost portions of the arms 36 are convexly curved to provide a pivotal support for the bracing member as a whole. The upper surface of the portion 35 is convexly curved and the under surface of the bracket 34 is concavely curved to provide a curved bearing between the bracket and the portion 35. Suitable means, such as a bolt 37 engaging a threaded opening in the portion 35 and bearing against the bracket 34, are provided for effecting an adjustment in the nature of a rocking motion of the bracing member. The bridge member in this modification comprises a rod or shaft 38 having an arcuate cranked portion 39 midway thereof adapted to find a pivotal mounting in the curved bearing between the portion 35 and the bracket 34. The ends of the shaft 38 are of circular cross section and receive eyeballs 40 slidably mounted thereon and more fully described hereinafter. The counterweight frame illustrated in this modification is of different construction from that shown in Fig. 2 and will also be more fully described hereinafter.

The installation of this type of construction is similar to that of a construction illustrated in Figs. 1 and 2. The bracing member is either loosely attached or suspended from the bracket 34, or, as is preferable, entirely detached therefrom. The eyeballs are slidably mounted on the shaft 38, and the counterweight attached thereto, and this assembly is then inserted into the doll's head into approximate position. The movable bracing member is then preferably inserted for the first time and slid over the end of the bracket 34 into a position forming a bearing and support for the bridge member. The eyeballs are then adjusted to the eyesockets of that particular head by virtue of their slidable mounting on the shaft 38 and the ability of the bridge member to rock in an axial plane within its bearing. After the adjustment has been effected, the bolt 37 is manipulated to rock the bracing member whereby the bridge member will be clamped in position and at the same time the bracing member will be firmly secured to the bracket.

In Figs. 6–8, I have illustrated slight modifications in construction. The bracket in Fig. 6 is provided with a vertical slot 41, and a bracing member 42 similar in construction to that shown in Fig. 1, is removably attached thereto by bolt and nut means 43 passing through the bracing member and through the slot. In this construction the upper surface of the bracing member is convexly curved as in Fig. 4 and the under surface of the bracket is concavely curved to provide a curved bearing of the nature disclosed in Fig. 4. The bridge member is substantially of the same construction as that of Fig. 4 and the method of installation of the device will be apparent to those skilled in the art from what has gone before.

In Fig. 8, the bracket is slotted in a manner similar to that shown in Fig. 6, and the only substantial difference in construction is that of the bracing member. In this modification, I have illustratively shown a bracing member 44 comprising a portion 45 overlying the bracket and provided with a threaded opening, and a portion 46 underlying the bracket at a spaced distance therefrom and having an upper surface convexly curved for the purpose hereinbefore described. A bolt 47 passes through the portion 46, through the slot in the bracket, and engages the threaded opening in the portion 45, whereby the necessity for a nut as shown in Fig. 6 is eliminated. The method of installing the mechanism illustrated in this modification will be apparent.

The counterweight illustrated by way of example in Figs. 8 and 9 is of a modified construction comprising right angular members 48 superposed along one arm of each thereof to form a U-shaped frame of adjustable width, whereby the counterweight frame will adjust itself to the axial spacing between the eyeballs. The ends of each of the superposed arms 48 are provided with tabs 49 for embracing and guiding the other arm 48. The weight 50 is carried at the end of a strip 51 having a hooked end 52 adapted to be hooked over the cross piece of the U. The parallel arms of the U are provided with suitable openings for attachment to the eyeballs.

The counterweight frame shown by way of example in Figs. 4–7 inclusive, comprises a wire element or member doubled on itself to grip a weight 53, and bent to form a substantially Y-shaped frame having parallel spaced ends 54 and angular or zig-zag portions 55 between the ends and the stem of the Y. The ends 54 are insertible through suitable openings in the eyeballs for purposes of attachment thereto and the angularity of the portions 55 allows resilient adjustment of the frame to the axial spacing of the eyeballs.

The eyeballs illustrated in the embodiments of Figs. 4–9 inclusive, are shown in detail in Figs. 10–12. An eyeball of this construction comprises a sleeve 56 adapted to be slidably and rotatably mounted upon a spindle or shaft such as the shaft 38 in Fig. 5, a substantially hemispherical frame 57 having diametrically opposed openings 58 to receive opposite ends of the sleeve, and a hemispherical covering 59 bearing markings simulating an eyeball and having suitable tabs 60 at spaced intervals along its periphery to grip the peripheral edge of the frame 57. The frame 57 is provided with integral tabs 61 adjacent to the openings 58 and bendable to grip the sleeve 56 and hold it in position in the openings 58. In some cases I prefer to provide openings 62 in the frame 57 in the intervals between the tabs 61 to receive the ends of a counterweight frame such as that shown in Fig. 5 or in Fig. 7. In such a case the ends 54 of the counterweight frame pass through the openings 62 and are bent to pass the sleeve 56 right in back thereof (Fig. 5) or in front thereof (Fig. 7.) In other cases, I prefer to provide additional bendable tabs 63 (see Fig. 9) which are insertible into suitable openings in a counterweight frame of the type shown in Figs. 8 and 9.

In Figs. 13–18 inclusive, I have shown the relatively movable and adjustable bracing members in a construction wherein they are adapted to engage opposite walls of the doll head, preferably by biting thereinto.

Referring particularly to Figs. 13 and 14, I have shown relatively movable members 64 and 65 engaging the front and rear portions of the head respectively, and supporting the bridge member 66 therebetween. The member 65 is provided with an inclined midportion 67 engaged by a free end 68 of the member 64. Suitable means such as a bolt 69 is provided for moving the members transversely of each other for the purpose of gripping and clamping the bridge member 66. Such transverse movement will cause the free end 68 to bear against and cooperate with the inclined portion 67 whereby relative longitudinal movement of the members will be effected to increase their combined effective length and thereby cause them to bite more deeply and find a secure permanent footing in the opposite walls of the head. With this object in view, I provide one of the members with a threaded opening 70 to receive the bolt 69 and the other member with an elongated opening 71 to permit the relative longitudinal movement. In this construction I also prefer to provide the forward end of the member 65 with a spring strip 72 adapted to engage the forward wall of the doll head for the purpose of temporarily securing the member 65 in position.

In this construction I have shown the eye mechanism proper as consisting of a shaft or spindle 73, eyeballs 74 slidably and rotatably mounted thereon, and a counterweight frame 75 carried by the eyeballs. The counterweight frame is in this construction substantially Y-shaped, having elongated openings 76 at the extremities of the arms of the Y to receive bendable fastening means 77 carried by the eyeballs, whereby relative axial adjustment of the eyeballs is made possible.

The assembly and installation of this construction is effected by assembling the eyeballs and the counterweight frame on the bridge member, then inserting this mechanism in to the head of the doll and adjusting the eyeballs to the particular sockets in question, and thereupon inserting the supporting device consisting of the members 64 and 65 into the head to support the bridge member between them, and subsequently tightening the screw 69. This manipulation of the screw 69 will cause a simultaneous clamping of the bridge member 66 and a spreading or extension of the members 64 and 65 whereby they will be secured in position.

In Figs. 15–18, I have shown modifications comprising a toggle frame consisting of toggle members and a supporting element or strut cooperating therewith.

Referring particularly to Figs. 15 and 16, I have shown toggle members 78 and 79, one of which (78) is preferably bifurcated and is provided with a portion 80 connecting the bifurcated portions and provided with a threaded opening therein. A strut 81 underlies the members 78 and 79, and is provided with an elongated opening 82 through which a bolt or similar means is passed to engage with the threaded opening in the portion 80 of member 78. The forward end of the strut 81 underlies the bridge member 84, and the forward portion of the member 78 overlies the bridge member 84 so that the latter is supported between the strut and the member 78. The rear end of the strut 81 is preferably bent upwards and terminates in a stepped end 85 engaging the member 79. The members 78 and 79 are preferably provided with a series of spaced openings 86 adjacent their pivoted ends, and suitable connecting means such as a cotter pin 87 is passed through certain of these openings to pivotally connect the members 78 and 79 at a selected point. I prefer to provide a spring 88 engaging the members 78 and 79 at its ends and passing over the cotter pin 87 for the purpose of preventing total collapse of the toggle frame during its preliminary adjustment.

In this embodiment the eye mechanism is assembled as before, inserted and adjusted within the head of the doll, and thereupon the supporting device consisting of the members 78, 79, and 81 is inserted into the doll head in substantially the position shown in Fig. 15. Certain of the holes 86 and certain of the steps of the end 85 are selected to be operative depending upon the size and proportions of the particular doll head. The spring 88 serves to hold the entire frame in a temporary braced position against the opposite walls of the head, and subsequent manipulation of the bolt 83 will cause simultaneous clamping of the bridge member 84 and spreading of the members 78 and 79 to cause them to find a permanent and secure footing.

In Fig. 17 I have shown a slight modification of the construction shown in Fig. 15, in that the strut 81 has been replaced by a supporting element 89 pivotally carried by the member 90 of the toggle members 90 and 91. The forward end of the element 89 supports the bridge member 92 from below and the forward end of the member 90 lends support to the bridge member from above. The forward end of the member 91 is extended to provide a portion 93 underlying the rear end 94 of the element 89. One of the portions 93 and 94 is provided with a threaded opening, and the other with an elongated opening, whereby a bolt or the like 95 may pass through the elongated opening and engage the threaded opening.

After installation, in accordance with the method described hereinabove, manipulation of the bolt 95 will cause the element 89 to rock and will also draw the end 94 toward the extended portion 93. Rocking of the element 89 will clamp the bridge member 92, and simultaneously a spreading of the members 90 and 91 will have been effected which will cause them to bite more firmly and to secure a permanent footing in the opposite walls of the head.

It will be obvious that various modifications in the details herein described and illustrated for the purpose of explaining the nature of my invention may be made by those skilled in the art within the scope and principle of my invention as set forth in the following claims.

Having thus described my invention what I claim as new and desire to secure by Letters Patent is:

1. In a doll head having movable eyes, in combination, a bridge member mounted within the said head for rockable movements of adjustment relative to the eye sockets in the head, means for holding said bridge member stationary in a selected position of adjustment, eye balls slidably mounted on said bridge member and rotatably mounted with respect to the axis thereof and a counter weight carried by said eye balls.

2. In a doll head having movable eyes, in combination, a supporting bracket mounted for rockable adjustment within the said head, a bridge member, means whereby the bridge member is connected with the bracket to rock adjustably thereon, means to hold the bridge member and bracket in any position to which they may be adjusted, eyeballs slidably mounted on said bridge member and rotatably mounted with respect to the axis thereof and a counter weight carried by the eyeballs.

3. In a doll having movable eyes, in combination, a supporting bracket carried within the head of the doll and having a curved under surface, a bracket member carried by the bracket and having a curved portion below the bracket to form a curved bearing between said portion and the bracket, a bridge member mounted within said bearing to rock in an axial plane, said bridge member having a curved portion received in said bearing, and eyeballs mounted on said bridge member and rotatably mounted with respect to the axis thereof, together with a gravity control for said eye balls.

4. In a doll having movable eyes, in combination, a supporting bracket carried within the head of the doll, a bridge member, means providing a curved bearing within which the bridge member is mounted to rock in an axial plane, said bridge member having a curved portion received in said bearing, eyeballs slidably mounted on said bridge member, and a counterweight carried by the eyeballs.

5. In a doll having movable eyes, in combination, a supporting bracket carried within the head of the doll, and having a curved under surface, a bracing member carried by the bracket and having a curved portion below the bracket to form a curved bearing between said portion and the bracket, a bridge member having an arcuate cranked portion disposed in said bearing whereby the bridge member is mounted to rock in an axial plane, eye balls rotatably mounted on the bridge member, and gravity control for the eye balls.

6. In a doll having movable eyes, in combination, a supporting bracket carried within the head of the doll and having a concave under surface, a bracing member adjustably carried by the bracket and having a portion below the bracket having a convex upper surface to form a bearing between said portion and the bracket, a bridge member having an arcuate cranked portion disposed in said bearing whereby the bridge member is mounted to rock in an axial plane, eye balls rotatably mounted on the bridge member, and a gravity control for the eye balls.

7. In a doll having movable eyes, in combination, a supporting bracket having a curved bearing part within the head of the doll, a bridge member having a curved bearing portion engaging within the mentioned bearing to thereby facilitate adjustment of the bridge member in an axial plane, eyeballs slidably mounted on said bridge member and rotatably mounted with respect to the axis thereof, and a counterweight carried by the eyeballs.

8. In a doll having movable eyes, in combination, a supporting bracket carried within the head of the doll and having a concave under surface, a bracing member adjustably carried by the bracket and having a portion below the bracket having a convex upper surface to form a bearing between said portion and the bracket, a bridge member having a convexedly curved bearing portion engaging within the mentioned bearing whereby the bridge member is mounted to rock in an axial plane, and eyeballs slidably mounted on said bridge member and rotatably mounted with respect to the axis thereof, together with a gravity control for the eyes.

9. In a doll having movable eyes, in combination, a supporting bracket integral with and projecting into the interior of the head of the doll, a relatively movable bracing member having arms embracing said bracket and having a portion below the bracket to form a bearing between said portion and the bracket, a bridge member mounted in said bearing, eyeballs mounted on said bridge member, and means carried by said bracing member and cooperating with said bracket to move the bracing member to clamp said bridge member in said bearing, together with gravity control means for said eyeballs.

10. In a doll having movable eyes, in combination, a supporting bracket integral with and projecting into the interior of the head of the doll, a bracing member pivotally carried by said bracket and having a portion below the bracket to form a bearing between said portion and the bracket, a bridge member, means whereby the bridge member is mounted in said bearing to rock in an axial plane, eyeballs slidably and rotatably mounted on said bridge member, and means carried by the bracing member and cooperating with the bracket to rock said bracing member with respect to the bracket to clamp said bridge member in said bearing.

11. In a doll having movable eyes, in combination, a supporting bracket integral with and projecting into the interior of the head of the doll, a bracing member having a body portion below the bracket and integral arms embracing said bracket and pivotally carried thereby, a bridge member, means whereby the bridge member is mounted between said body portion and the bracket to rock in an axial plane, eyeballs slidably and rotatably mounted on said bridge member, and a bolt carried by said body portion and movable against said bracket to rock said bracing member to clamp said bridge member in position, together with gravity control means for said eye balls.

12. In a doll having movable eyes, in combination, a supporting bracket integral with and projecting into the interior of the head of the doll and having a concave under surface, a bracing member having arms pivotally carried by the bracket and a portion below the bracket having a convex upper surface to form a bearing between said portion and the bracket, a bridge member engaging in said bearing, eyeballs slidably and rotatably mounted on said bridge member, and means carried by said bracing member and cooperating with said bracket to rock the bracing member to clamp the bridge member in said bearing.

13. As an article of manufacture, a counterweight for a doll having movable elements, said counterweight comprising a weight, a wire member doubled on itself to grip the weight and bent to form a substantially Y-shaped frame having parallel spaced ends to engage the element and zig-zag portions between said ends and the stem of the Y.

14. In a doll having movable elements, in combination, a bridge member carried within the head of the doll, elements slidably and rotatably mounted on said bridge member, and a counterweight carried by said elements, said counterweight comprising a weight, a resilient member doubled on itself to grip said weight and bent to form a substantially Y-shaped frame having parallel spaced ends to engage the elements and angular portions between said ends and the stem of the Y.

15. As an article of manufacture, a doll's eyeball comprising a sleeve, a substantially hemispherical member having diametrically opposed cut-out portions to receive opposite ends of the sleeve and provided with tabs adjacent the cut-out portions and bendable to grip said sleeve.

16. As an article of manufacture, a doll's eyeball comprising a sleeve, a substantially hemispherical hollow frame having diametrically opposed cut-out portions along its periphery to receive opposite ends of the sleeve and provided with integral hooked tabs adjacent the cut-out portions and bendable to grip said sleeve, said frame being also provided with diametrically opposed openings between said tabs to receive a counterweight arm, and a hemispherical covering for said frame bearing markings simulating an eye-ball and having tabs at the intervals between said cut-out portions and openings and bendable to grip the frame.

17. An eye set for dolls, said eye set comprising a bridge member, eye balls carried spaced apart rotatably upon the bridge member, gravity means for controlling the eye balls, and means engaging the bridge member intermediate said eye balls comprising parts manually adjustable to clamp the bridge member into fixed engagement with a portion of the doll head in the region between the eye balls.

18. An eye set for dolls, said eye set comprising a bridge member, eye balls carried spaced apart rotatably upon the bridge member, gravity means for controlling the eye balls, means engaging the bridge member intermediate said eye balls comprising parts manually adjustable to clamp the bridge member into fixed engagement with a portion of the doll head, and said clamp means and bridge member having parts co-operative to facilitate manual adjustment of the bridge member in an axial plane.

19. An eye set for dolls, said eye set comprising a pair of eyes arranged spaced apart, means whereby said eyes are rotatable upon a horizontal axis, said means including a bridge member extending between and connected to the eyes, gravity means for controlling the eyes, and means engaging the bridge member intermediate the eyes having opposing clamp parts adapted to engage portions of the doll head between them in the region intermediate the eye sockets of said head and manually operable to fasten itself rigidly with the doll head and provide a mounting for the bridge member.

20. An eye set comprising a pair of eyes, a bridge member extending between and having pivotal connection with the eyes, the eyes being spaced apart along the length of the bridge member and being pivotally co-axial, a gravity control for the eyes, the portion of the bridge member intermediate the eyes providing a pivot bearing off-set with respect to the pivotal axis of the eyes, and supporting means engaging said off-set bearing whereby to provide for adjustment of the eyes with respect to said off-set bearing.

21. An eye set comprising a pair of eyes, a bridge member providing a co-axial pivot support for the eyes, a gravity control for the eyes, the bridge member having a portion off-set with respect to the pivotal axis of the eyes, and supporting means for the bridge member engaging said off-set portion adjustable to facilitate movement of the bridge member with respect to its engagement with said supporting means to thereby alter the position of the pivotal axis of the eyes with respect to said supporting means.

22. The combination with a doll head having eye openings therein, of an eye set comprising a pair of eyes for engaging within said openings, connecting means extending between said eyes, a gravity control for the eyes, a support for the eyes having pivotal engagement with a portion of the head and arranged to be swung about said pivot into engagement with said eye connecting means to clamp said eye connecting means fixedly to the head, and a part engaging between said support and the head operable to so swing the support.

23. The combination with a doll head having eye openings therein, of an eye set comprising a pair of eyes for engaging within said openings, connecting means extending between said eyes, a gravity control for the eyes, and a support for the eyes having engagement with the eye connecting means permitting adjustment of the eye connecting means relative to the doll head, said support having pivotal engagement with a portion of the doll head, and said support also comprising manually adjustable means to move it about its pivotal connection with the head to hold the eye connecting means in adjusted position.

24. An eye set comprising a pair of eyes, a cross rod extending between said eyes, each eye comprising a semispherical shell having a tubular member fixed thereto for receiving the cross rod, the cross rod and tubular members constituting a pivotal support for the eyes, and a gravity control for the eyes comprising parts engaging the eyes respectively and extending into connection with said tubular members to hold them connected with the eyes.

25. As an article of manufacture, a doll's eye ball comprising a sleeve, a substantially hemispherical hollow frame having diametrically opposed cut-out portions along its periphery to receive opposite ends of the sleeve and provided with integral hooked tabs adjacent the cut-out portions and bendable to grip said sleeve, and said frame being also provided with diametrically opposed openings between said tabs to receive a counterweight arm.

26. As an article of manufacture, a doll's eye ball comprising a hemispherical hollow shell, a sleeve extending diametrically across said shell at the rear open side thereof to receive a bridge member of an eye set, and the shell having means provided at diametrically opposite sides thereof engaging adjacent end portions of the sleeve to hold the sleeve assembled with the shell.

27. In a doll having movable eyes, in combination, a supporting bracket carried within the doll head, a bridge member, a pair of eye balls carried by the bridge member one at each end thereof arranged to oscillate upon a common horizontal axis, gravity control means for said eyes, means whereby the bridge member is connected with the bracket to rock adjustably with respect to the bracket about an axis transverse to the length of the bridge member, and means manually operable to hold the bridge member in any position to which it is adjustably rocked with respect to the bracket.

28. In a doll having movable eyes, in combination, a supporting bracket carried within the doll head, a bridge member, a pair of eye balls carried by the bridge member one at each end thereof arranged to oscillate upon a common horizontal axis, gravity control means for said eyes, means whereby the bridge member is connected with the bracket to rock adjustably with respect to the bracket about axes both longitudinally and transversely of the bridge member, and screw operated means to hold the bridge member in any position to which it is adjustably rocked.

Signed at New York, in the county of New York and State of New York, this 11th day of July, A. D. 1925.

LOUIS A. NEMCOVSKY.